United States Patent
Imagawa et al.

(10) Patent No.: US 12,224,129 B2
(45) Date of Patent: Feb. 11, 2025

(54) FILM CAPACITOR, CONNECTED CAPACITOR, INVERTER, AND ELECTRIC VEHICLE

(71) Applicant: KYOCERA Corporation, Kyoto (JP)

(72) Inventors: Kazuki Imagawa, Kirishima (JP); Naoki Kikuchi, Kirishima (JP); Yuki Senoo, Kirishima (JP); Nobuhiro Kobayashi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 139 days.

(21) Appl. No.: 18/007,238

(22) PCT Filed: Jul. 1, 2021

(86) PCT No.: PCT/JP2021/025020
§ 371 (c)(1),
(2) Date: Jan. 27, 2023

(87) PCT Pub. No.: WO2022/024661
PCT Pub. Date: Feb. 3, 2022

(65) Prior Publication Data
US 2023/0274888 A1   Aug. 31, 2023

(30) Foreign Application Priority Data

Jul. 31, 2020 (JP) .................................. 2020-130740

(51) Int. Cl.
*H01G 4/30* (2006.01)
*B60L 50/60* (2019.01)
(Continued)

(52) U.S. Cl.
CPC ............. *H01G 4/306* (2013.01); *B60L 50/60* (2019.02); *H01G 4/14* (2013.01); *H01G 4/38* (2013.01); *H02P 27/06* (2013.01); *B60L 2210/40* (2013.01)

(58) Field of Classification Search
CPC ............ H01G 4/306; H01G 4/14; H01G 4/38; H01G 4/232; H01G 4/30; H01G 4/015;
(Continued)

(56) References Cited

U.S. PATENT DOCUMENTS

2016/0055974 A1   2/2016  Kojima et al.
2018/0090277 A1*  3/2018  Kikuchi .................. H02P 27/06
(Continued)

FOREIGN PATENT DOCUMENTS

| CN | 105393319 A | 3/2016 |
| JP | 5990325 B2 | 9/2016 |
| WO | 2019188684 A1 | 10/2019 |

*Primary Examiner* — Nathan Milakovich
*Assistant Examiner* — Daniel M Dubuisson
(74) *Attorney, Agent, or Firm* — Volpe Koenig

(57) ABSTRACT

A film capacitor includes a stack including at least one dielectric film and a plurality of metal films, the at least one dielectric film including a polyarylate film, wherein each of the at least one of dielectric film and each of the plurality of metal films are alternately stacked in a stacking direction, each of the plurality of metal films deposited on each of the at least one dielectric film by vapor deposition, cover films on two first side surfaces, the two first side surfaces facing each other in a first direction, the first direction orthogonal to the stacking direction, the cover films containing a polyester hot-melt resin, and metal-sprayed electrodes on two second side surfaces, the two second side surfaces facing each other in a second direction, the second direction perpendicular to the first direction and orthogonal to the stacking direction.

7 Claims, 5 Drawing Sheets

(51) Int. Cl.
*H01G 4/14* (2006.01)
*H01G 4/38* (2006.01)
*H02P 27/06* (2006.01)

(58) Field of Classification Search
CPC .. H01G 4/33; H01G 4/18; H01G 4/40; H01G 4/224; H01G 4/32; B60L 50/60; B60L 2210/40; H02P 27/06; Y02T 10/70
See application file for complete search history.

(56) References Cited

U.S. PATENT DOCUMENTS

| | | |
|---|---|---|
| 2019/0115152 A1* | 4/2019 | Kikuchi .................. H01G 4/32 |
| 2019/0122819 A1* | 4/2019 | Kikuchi ................. H01G 4/015 |
| 2019/0172642 A1* | 6/2019 | Yamazaki ................ H01G 4/18 |
| 2021/0098197 A1 | 4/2021 | Tateishi |

\* cited by examiner

FILM CAPACITOR, CONNECTED CAPACITOR, INVERTER, AND ELECTRIC VEHICLE

TECHNICAL FIELD

The present disclosure relates to a film capacitor, a connected capacitor, an inverter including the connected capacitor, and an electric vehicle.

BACKGROUND OF INVENTION

A known technique is described in, for example, Patent Literature 1.

CITATION LIST

Patent Literature

Patent Literature 1: Japanese Patent No. 5990325

SUMMARY

In an aspect of the present disclosure, a film capacitor includes a stack including at least one dielectric film and a plurality of metal films, the at least one dielectric film including a polyarylate film, wherein each of the at least one of dielectric film and each of the plurality of metal films are alternately stacked in a stacking direction, each of the plurality of metal films deposited on each of the at least one dielectric film by vapor deposition, cover films on two first side surfaces, the two first side surfaces facing each other in a first direction, the first direction orthogonal to the stacking direction, the cover films containing a polyester hot-melt resin, and metal-sprayed electrodes on two second side surfaces, the two second side surfaces facing each other in a second direction, the second direction perpendicular to the first direction and orthogonal to the stacking direction.

In another aspect of the present disclosure, a connected capacitor includes a plurality of film capacitors including the above film capacitor, and a busbar connecting the plurality of film capacitors.

In another aspect of the present disclosure, an inverter includes a bridge circuit including a switching element, and a capacitance portion connected to the bridge circuit. The capacitance portion includes the above film capacitor.

In another aspect of the present disclosure, an electric vehicle includes a power supply, an inverter connected to the power supply and being the above inverter, a motor connected to the inverter, and wheels drivable by the motor.

BRIEF DESCRIPTION OF THE DRAWINGS

The objects, features, and advantages of the present disclosure will become more apparent from the detailed description and the drawings described below.

DESCRIPTION OF EMBODIMENTS

A stacked film capacitor that forms the basis of a stacked film capacitor according to one or more embodiments of the present disclosure typically includes a body cut from an elongated stack and thus is to have cut surfaces with improved insulation. Patent Literature 1 describes a stacked polypropylene film capacitor including polypropylene films as dielectric films and including cover films containing a polyolefin hot-melt resin melted and bonded externally to exposed two side surfaces that are adjacent to two side surfaces with metal-sprayed electrodes. The cover films reduce discharge from the two externally exposed side surfaces under a voltage being applied.

Figure 1:
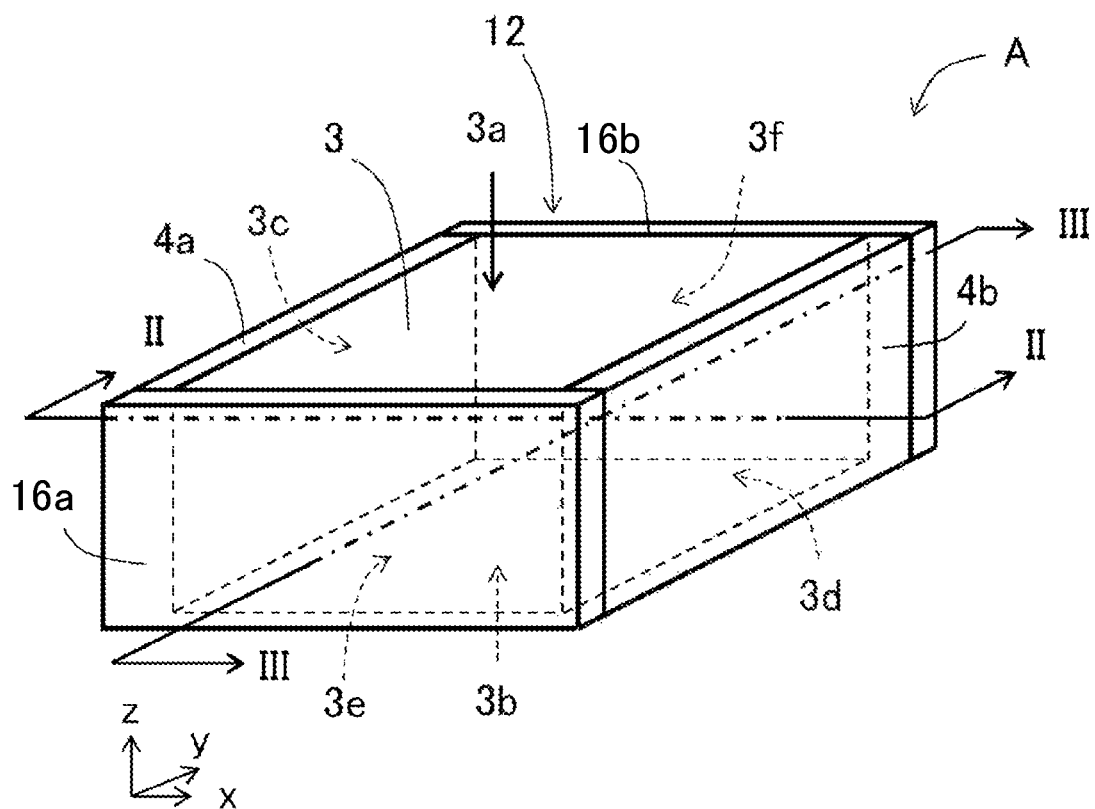
FIG. 1 is a perspective view of an example stacked film capacitor according to an embodiment of the present disclosure.
Figure 2:
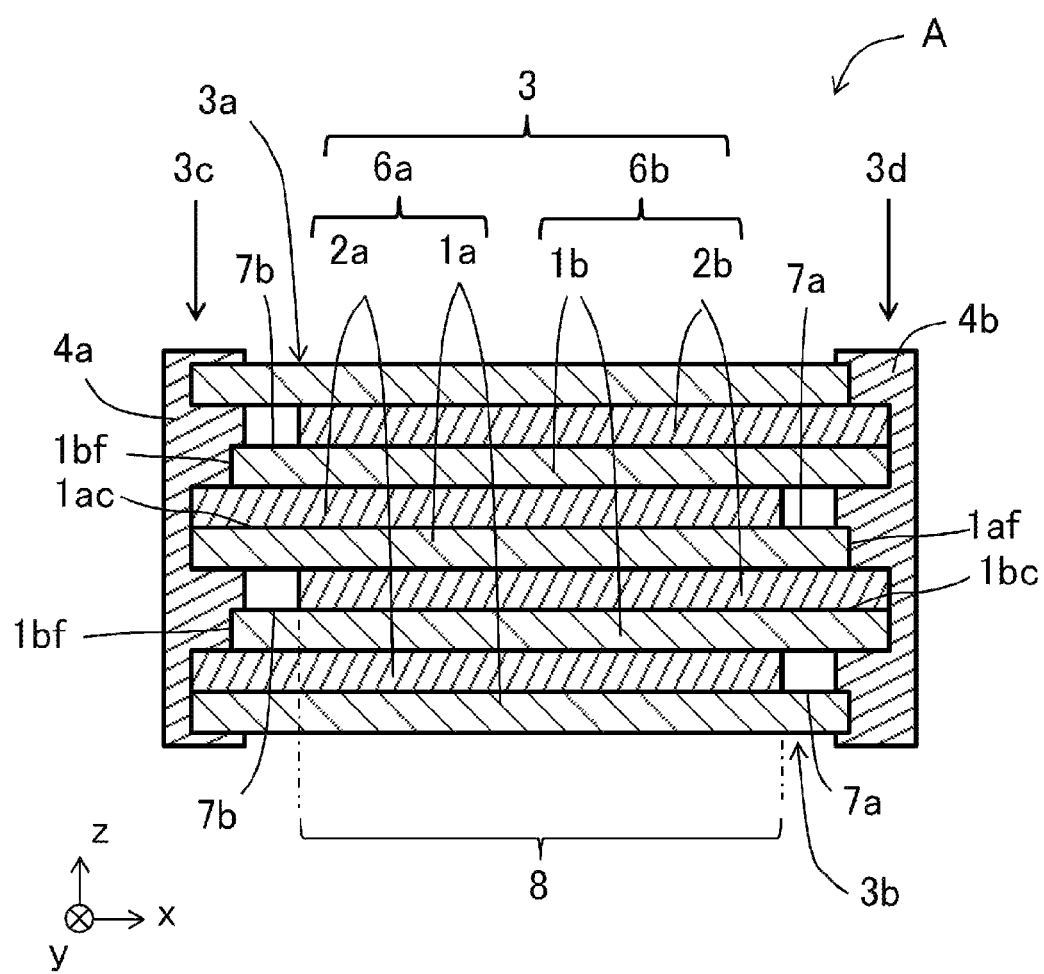
FIG. 2 is a cross-sectional view taken along line II-II in FIG. 1.
Figure 3:
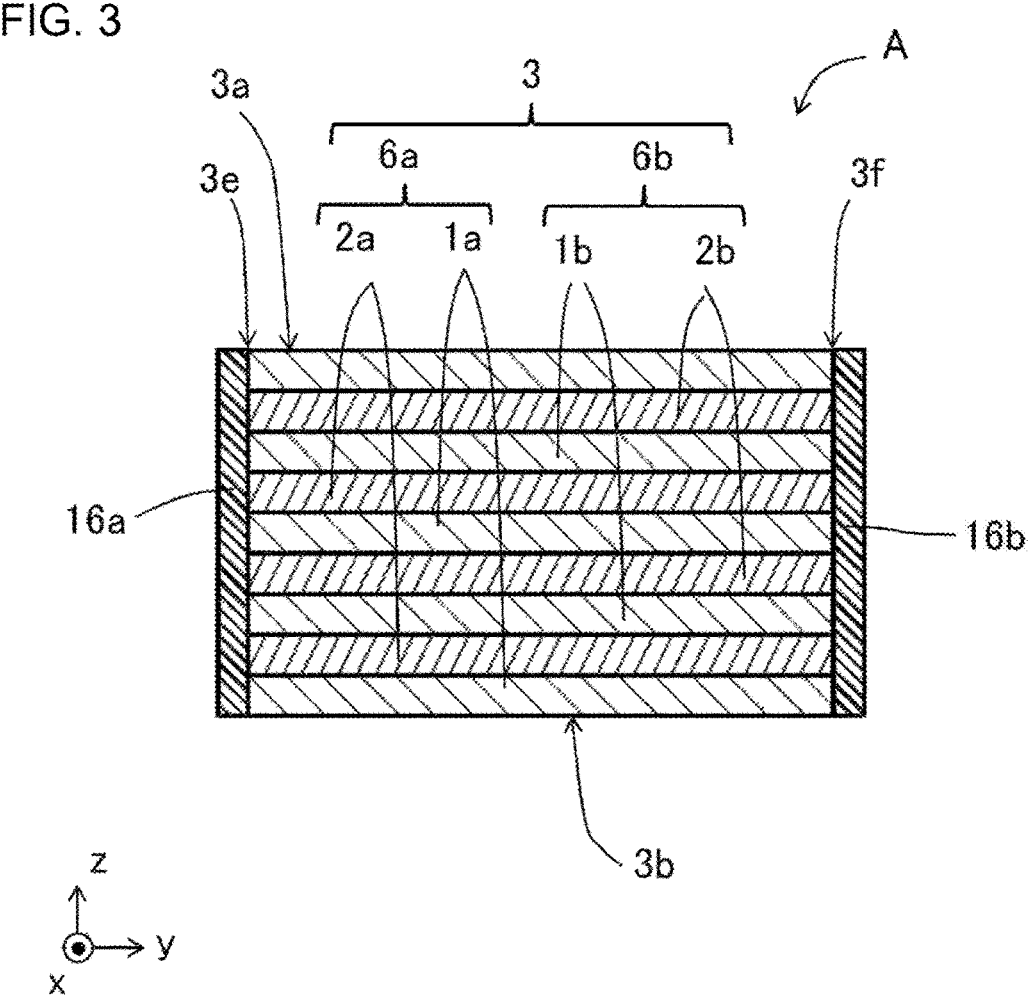
FIG. 3 is a cross-sectional view taken along line in FIG. 1.

FIG. 1 is a perspective view of an example stacked film capacitor according to an embodiment of the present disclosure. FIG. 2 is a cross-sectional view taken along line II-II in FIG. 1. FIG. 3 is a cross-sectional view taken along line in FIG. 1. As illustrated in FIGS. 1 to 3, a stacked film capacitor A includes a film capacitor body 3 and a pair of a first metal-sprayed electrode 4a and a second metal-sprayed electrode 4b. The film capacitor body 3 may also be simply referred to as the body 3. The body 3 includes a stack of first dielectric films 1a, first metal films 2a, second dielectric films 1b, and second metal films 2b. The body 3 is rectangular and includes a pair of first surfaces 3a and 3b opposite to each other in the stacking direction in which the dielectric films and the metal films are stacked, a pair of first side surfaces 3c and 3d, and a pair of second side surfaces 3e and 3f. The pairs are both located between the first surfaces 3a and 3b to connect the first surfaces 3a and 3b. In the figures referred to below, the dimensions of the components of the body 3 are exaggerated for ease of explanation. The thicknesses of the actual components are much smaller than the thicknesses of the illustrated components of the body 3. The metal films 2a and 2b are deposited on each of the at least one dielectric film 1a and 1b by vapor deposition.

The first metal-sprayed electrode 4a is formed on the first side surface 3c of the body 3, and the second metal-sprayed electrode 4b is formed on the first side surface 3d of the body 3 both through metal spraying. Cover films 16a and 16b that are electrically insulating are located on the second side surfaces 3e and 3f of the body 3.

As illustrated in FIG. 2, the body 3 in the stacked film capacitor A includes first metalized films 6a and second metalized films 6b that are alternately stacked on each other. Each first metalized film 6a includes the first metal film 2a on a surface 1ac of the first dielectric film 1a. Each second metalized film 6b includes the second metal film 2b on a surface 1bc of the second dielectric film 1b. Each first metal film 2a is electrically connected to the first metal-sprayed electrode 4a on the first side surface 3c of the body 3. Each second metal film 2b is electrically connected to the second metal-sprayed electrode 4b on the first side surface 3d of the body 3. As illustrated in FIG. 1, a first direction x refers to the direction in which the first metal-sprayed electrode 4a and the second metal-sprayed electrode 4b are located, and a second direction y refers to the direction in which the cover films 16a and 16b are located. A third direction z refers to the thickness direction of the first dielectric films 1a and the second dielectric films 1b, or more specifically, the stacking direction.

Each first metalized film 6a includes the first dielectric film 1a and the first metal film 2a on the surface 1ac. Each first metalized film 6a includes, on the surface 1ac adjacent to a side surface 1af without the first metal film 2a being formed, or in other words, in an area on which the first dielectric film 1a is exposed, an insulating margin 7a extending continuously in the second direction y.

Each second metalized film 6b includes the second metal film 2b on the surface 1bc of the second dielectric film 1b. Each second metalized film 6b includes, on the surface 1bc adjacent to a side surface 1bf without the second metal film 2b being formed, or in other words, in an area on which the second dielectric film 1b is exposed, an insulating margin 7b extending continuously in the second direction y.

As illustrated in FIG. 2, the metalized films 6a and 6b are stacked on each other with a slight deviation from each other in the first direction x, which is also referred to as the width direction.

Any potential difference between the first metal film 2a and the second metal film 2b generates capacitance in an active area 8 in the first metal film 2a and the second metal film 2b overlapping each other across the first dielectric film 1a or the second dielectric film 1b.

The stacked film capacitor A described above is obtained in the manner described below. The first metalized film 6a and the second metalized film 6b that are both elongated are stacked on each other with a slight deviation from each other in the first direction x or the width direction, thus forming a stack. The first metal-sprayed electrode 4a is formed on the first side surface 3c in the first direction x of the resultant stack, and the second metal-sprayed electrode 4b is formed on the first side surface 3d. The stack including the metal-sprayed electrodes 4, or specifically the first metal-sprayed electrode 4a and the second metal-sprayed electrode 4b, is cut in the first direction x into individual elements. The metal-sprayed electrodes 4 may be formed on the individual bodies 3 cut from the stack. The cut surfaces resulting from the stack being cut are the second side surfaces 3e and 3f of the bodies 3.

The features common to the first metalized film 6a and the second metalized film 6b in the stacked film capacitor A according to the present embodiment will be described below. In FIG. 3, the components may be simply referred to as dielectric films 1, metal films 2, the metal-sprayed electrodes 4, or metalized films 6 without the reference signs a and b.

As illustrated in FIGS. 1 to 3, in the present embodiment, the film capacitor A includes, among the four side surfaces 3c, 3d, 3e, and 3f of a film capacitor device 12 including the stack of the metalized film 6a and 6b, the two side surfaces 3e and 3f adjacent to the other two side surfaces 3c and 3d with the metal-sprayed electrodes 4a and 4b. The side surfaces 3e and 3f are located on the two ends of the film capacitor device 12 in the length direction (lateral direction in FIG. 3) and are entirely covered with cover films 16a and 16b for separation from outside. The two cover films 16a and 16b are melted and bonded (bonded by melting) to the side surfaces of the dielectric films 1a and 1b in the metalized films 6a and 6b exposed on the side surfaces 3e and 3f.

In the present embodiment, the film capacitor A is thus less likely to have a leakage current from the two side surfaces 3e and 3f, and can have a longer creepage distance between the metal films 2a and 2b in the metalized films 6a and 6b to reduce short-circuiting resulting from discharge between the metal films 2a and 2b and to have an improved withstand voltage. The side surfaces of the dielectric films 1a and 1b in the metalized films 6a and 6b exposed on the side surfaces 3e and 3f are fully in close contact with the cover films 16a and 16b to prevent entry of moisture and air between the side surfaces of the dielectric films 1a and 1b (and thus the side surfaces of the metalized films 6a and 6b) and the cover films 16a and 16b.

The two cover films 16a and 16b include polyester hot-melt films containing a polyester hot-melt resin similar to polyarylate in the dielectric films 1a and 1b in the metalized films 6a and 6b and having high performance in thermal melting and bonding (melting and bonding performance) to polyarylate. Using the two cover films 16a and 16b containing the resin material, the cover films 16a and 16b are melted and bonded reliably and firmly to the side surfaces of the dielectric films 1a and 1b in the metalized films 6a and 6b exposed on the two side surfaces 3e and 3f of the film capacitor device 12.

Figure 4:
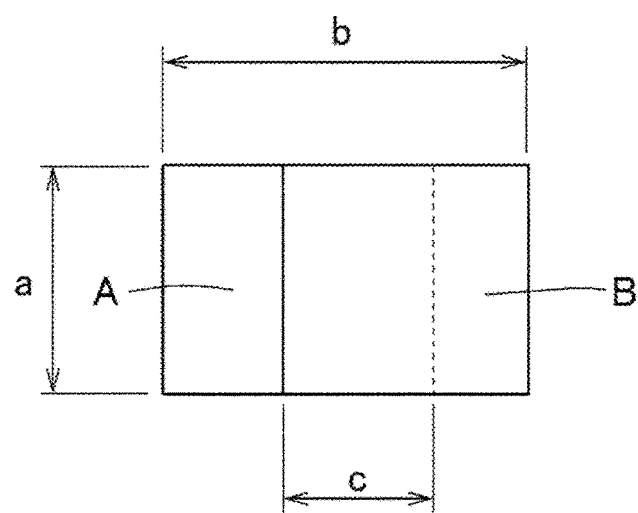
FIG. 4 is a schematic diagram of a test piece for examining the bonding state.

FIG. 4 is a schematic diagram of a test piece for examining the bonding state. A polyethylene terephthalate plate B containing a resin similar to polyarylate was bonded to a rectangular plate A with a vertical width a of 25 mm, a horizontal width b of 33 mm, and a thickness t of 2 to 5 mm including a polyarylate plate by heat treatment at 100° C. A polycarbonate plate B was also bonded to a rectangular plate A by heat treatment at 180° C. The bonding state of each test piece was examined to reveal that the polyethylene terephthalate plate and the polycarbonate plate were both bonded firmly to the polyarylate plates.

The two cover films 16a and 16b are to contain a polyester hot-melt resin, although the two cover films 16a and 16b may contain a polyester hot-melt resin of any type or with any structure. More specifically, various known polyester hot-melt resins can be used as a material for the two cover films 16a and 16b.

The two cover films 16a and 16b including such a polyester hot-melt resin are formed to cover the entire surfaces of the side surfaces 3e and 3f of the film capacitor device 12 using, for example, the methods described below.

The first method is, for example, to form a film of polyester hot-melt resin with a predetermined thickness by spraying the polyester hot-melt resin in a melted state with heat onto the entire side surfaces 3e and 3f of the film capacitor device 12 using a nozzle or by applying the resin using a roller. The ends of the metalized films 6a and 6b including the side surfaces of the dielectric films 1a and 1b exposed on the side surfaces 3e and 3f of the film capacitor device 12 are then melted with the heat of the polyester hot-melt resin in a melted state. These components are then cooled to solidify. This allows the two cover films 16a and 16b each containing the polyester hot-melt film to cover the entire side surfaces 3e and 3f of the film capacitor device 12 and to be melted and bonded to the side surfaces of the dielectric films 1a and 1b.

The second method is, for example, to form a polyester hot-melt film on the entire side surfaces 3e and 3f of the film capacitor device 12, and heat and melt the polyester hot-melt film. The ends including the side surfaces of the dielectric films 1a and 1b in the metalized films 6a and 6b exposed on the side surfaces 3e and 3f of the film capacitor device 12 may be melt These components are then cooled to solidify. This also allows the two cover films 16a and 16b to cover the entire side surfaces 3e and 3f of the film capacitor device 12 and to be melted and bonded to the side surfaces of the dielectric films 1a and 1b. The polyester hot-melt film to be formed on the side surfaces 3e and 3f of the film capacitor device 12 may be, for example, an extruded product in a semi-melted state formed with a predetermined die, in addition to a common film.

The cover films 16a and 16b on the side surfaces 3e and 3f of the film capacitor device 12 may have any thickness that may be, for example, about 0.1 to 1000 µm. The cover films 16a and 16b with a thickness of less than 0.1 µm may be too thin to achieve a sufficiently long creepage distance of the metal films 2a and 2b in the metalized films 6a and 6b and to have a sufficiently improved withstand voltage. The cover films 16a and 16b having a thickness exceeding 1000 µm may not achieve an improved effect and may have, for example, an increased cost of the cover films 16a and 16b. The cover films 16a and 16b may thus have a thickness of less than or equal to 1000 µm.

The polyester hot-melt resin in the two cover films 16a and 16b may have a lower melting point than polyarylate in the dielectric films 1a and 1b and have high wettability with the polyarylate to heat and melt the side surfaces of the dielectric films 1a and 1b in the metalized films 6a and 6b to which the cover films 16a and 16b are melted and bonded. A material with high wettability maintains the bonding strength with the polyarylate.

In manufacturing the film capacitor device 12, elongated protective films are formed on the two end faces of an elongated stack including multiple elongated metalized films 6a and 6b that are stacked alternately with a deviation between them in the width direction to form an elongated film capacitor device base material. This base material is then cut in the width direction using a cutting blade such as a rotary saw blade at, for example, multiple positions at a predetermined distance between them in the length direction. This produces multiple film capacitor devices 12 at a time. The two side surfaces 3c and 3d of the film capacitor device 12 in the width direction are the surfaces to receive the two metal-sprayed electrodes 4a and 4b, whereas the two side surfaces 3e and 3f of the film capacitor device 12 in the length direction, including the cut surfaces of the film capacitor base material, are the surfaces to receive the two cover films 16a and 16b.

When the cover films 16a and 16b are applied at temperatures greatly exceeding 220° C., which is the glass transition point (Tg) of polyarylate, the film capacitor device 12 can soften and deform or cause self-healing failure. Thus, the cover films 16a and 16b contain a polyester resin with a melting point of 150 to 250° C. that is less than or similar to the glass transition point Tg of 220° C. with high wettability and with a glass transition point Tg of 50 to 160° C.

The polyester hot-melt resin in the cover films 16a and 16b has a lower melting point than polyarylate as a resin material in the dielectric films 1a and 1b. The polyester hot-melt resin as the material in the cover films 16a and 16b thus reduces deformation of the dielectric films 1a and 1b, and reduces self-healing failure resulting from the heat of the polyester hot-melt resin in a melted state in the cover films 16a and 16b when the cover films 16a and 16b are melted and bonded to the side surfaces 3e and 3f of the dielectric films 1a and 1b (when the cover films 16a and 16b are formed on the side surfaces 3e and 3f of the film capacitor device 12). The polyester hot-melt resin with a low glass transition point Tg has high wettability with polyarylate and maintains the bonding strength with polyarylate, thus reducing the likelihood that the cover films 16a and 16b melted and bonded to the dielectric films 1a and 1b are separate from the dielectric films 1a and 1b. This structure can satisfy the operating temperatures of 125 to 150° C. for high-temperature resistant film capacitors.

The polyester hot-melt resin in the cover films 16a and 16b has a melt viscosity in the range of 500 to 50000 mPa·s at 150 to 250° C.

As described above, in the present embodiment, the film capacitor A includes the two cover films 16a and 16b covering the entire surfaces of the remaining two side surfaces 3e and 3f other than the side surfaces 3c and 3d to receive the metal-sprayed electrodes 4a and 4b to reduce a leakage current from the two side surfaces 3e and 3f and provide a longer creepage distance between the metal films 2a and 2b of the metalized films 6a and 6b. The two cover films 16a and 16b containing the polyester hot-melt resin are melted and bonded to the side surfaces of the dielectric films 1a and 1b including polyester of the metalized films 6a and 6b exposed on the two side surfaces 3e and 3f. The side surfaces of the dielectric films 1a and 1b are thus fully in close contact with the cover films 16a and 16b without small gaps between them. This effectively and reliably reduces the entry of water vapor or air between the side surfaces of the dielectric films 1a and 1b and the cover films 16a and 16b. This is combined with an increase in the creepage distance between the metal films 2a and 2b to reduce degradation of the dielectric films 1a and 1b and the metal films 2a and 2b due to contact with water vapor. This also reduces discharge between the metal films 2a and 2b to effectively improve the withstand voltage.

The surfaces of the metal films 2a and 2b and the metal-sprayed electrodes 4a and 4b are oxidized to contain Al—O—Al, a hydroxyl group, or a carboxyl group. A polyolefin resin used for known cover films is a low polar resin and contains no carboxyl group or no hydroxyl group. The polyolefin resin thus interacts less with a metal oxide (with low van der Waals force and without a hydrogen bond). A polyester resin used for the cover films 16a and 16b is a polar resin, and contains an ether bond, a carbonyl group, a carboxyl group, or a hydroxyl group, which interacts highly with a metal oxide (with high van der Waals force and including a hydrogen bond). The cover films 16a and 16b in the present embodiment interact with the metal films 2a and 2b and with the metal-sprayed electrodes 4a and 4b more than known cover films. This effectively reduces the likelihood that the cover films 16a and 16b melted and bonded to the side surfaces 3e and 3f are separated.

The film capacitor A simply including the thin cover films 16a and 16b, each including a resin film, on the two side surfaces 3e and 3f may produce the advantageous features described above. The above features can be achieved without the entire film capacitor A becoming larger or the costs becoming higher.

Thus, the film capacitor according to the present embodiment can substantially reduce a leakage current, maintain the expected capacitor performance stably for a longer period, and improve the withstand voltage without increasing the size or the production cost of the film capacitor.

Figure 5:
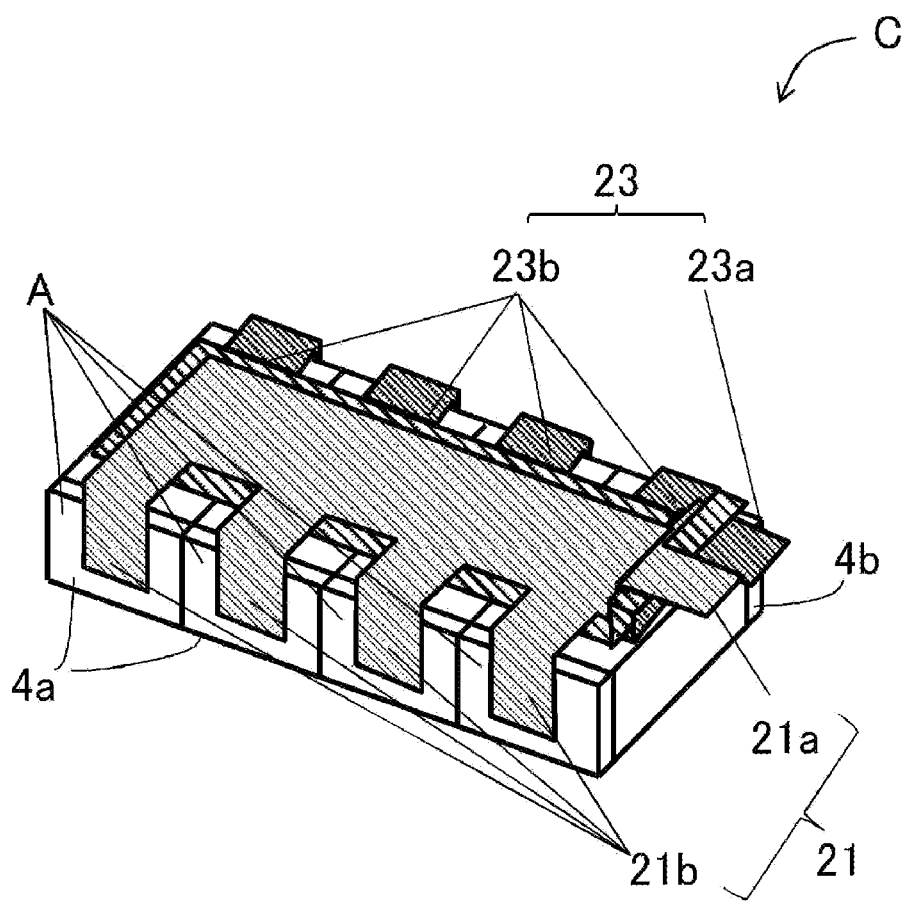
FIG. 5 is a perspective view of an example connected capacitor.

FIG. 5 is a schematic perspective view of a connected capacitor in an example. In FIG. 5, a case and an external resin covering the capacitor surface are not illustrated for ease of explanation. A connected capacitor C includes multiple stacked film capacitors connected in parallel with a pair of busbars 21 and 23. The busbars 21 and 23 include terminals 21a and 23a for external connection and lead terminals 21b and 23b. The lead terminals 21b and 23b are connected to the corresponding metal-sprayed electrodes 4a and 4b in the film capacitor.

The film capacitor in the connected capacitor C may include the film capacitor A with the cover films 16a and 16b. The resultant connected capacitor C may have insulation resistance less likely to decrease.

The connected capacitor C may include at least one film capacitor A, and may include two or more film capacitors A. The connected capacitor C includes multiple film capacitors, for example, four capacitors aligned with one another as illustrated in FIG. 4, and includes the busbars 21 and 23 attached to the metal-sprayed electrodes at the two ends of the body 3 with a bond.

The connected capacitor C may include the film capacitors arranged horizontally as illustrated in FIG. 5 or stacked vertically. The film capacitors may be arranged in the direction perpendicular to the first direction x in which the metal-sprayed electrodes 4 are located.

Figure 6:
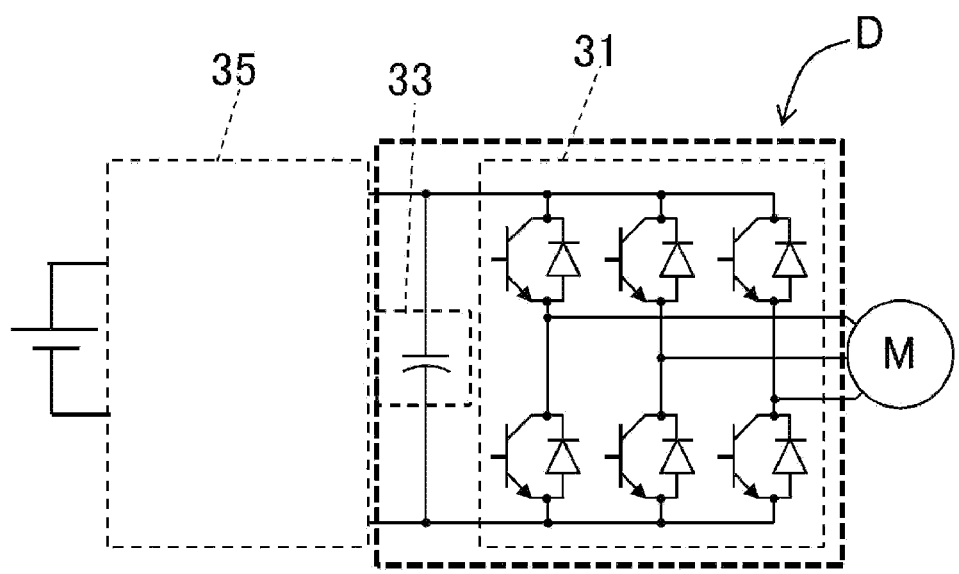
FIG. 6 is a schematic diagram describing an example inverter.

FIG. 6 is a schematic diagram describing an example inverter. FIG. 6 illustrates an inverter D that converts direct current (DC) to alternating current (AC). As illustrated in FIG. 6, the inverter D includes a bridge circuit 31 and a capacitance portion 33. The bridge circuit 31 includes switching elements such as insulated-gate bipolar transistors (IGBTs) and diodes. The capacitance portion 33 is across the input terminals of the bridge circuit 31 to stabilize the voltage. The inverter D includes the film capacitor A as the capacitance portion 33.

The inverter D is connected to a booster circuit 35 that raises the voltage of a DC power supply. The bridge circuit 31 is connected to a motor generator M as a drive source.

Figure 7:
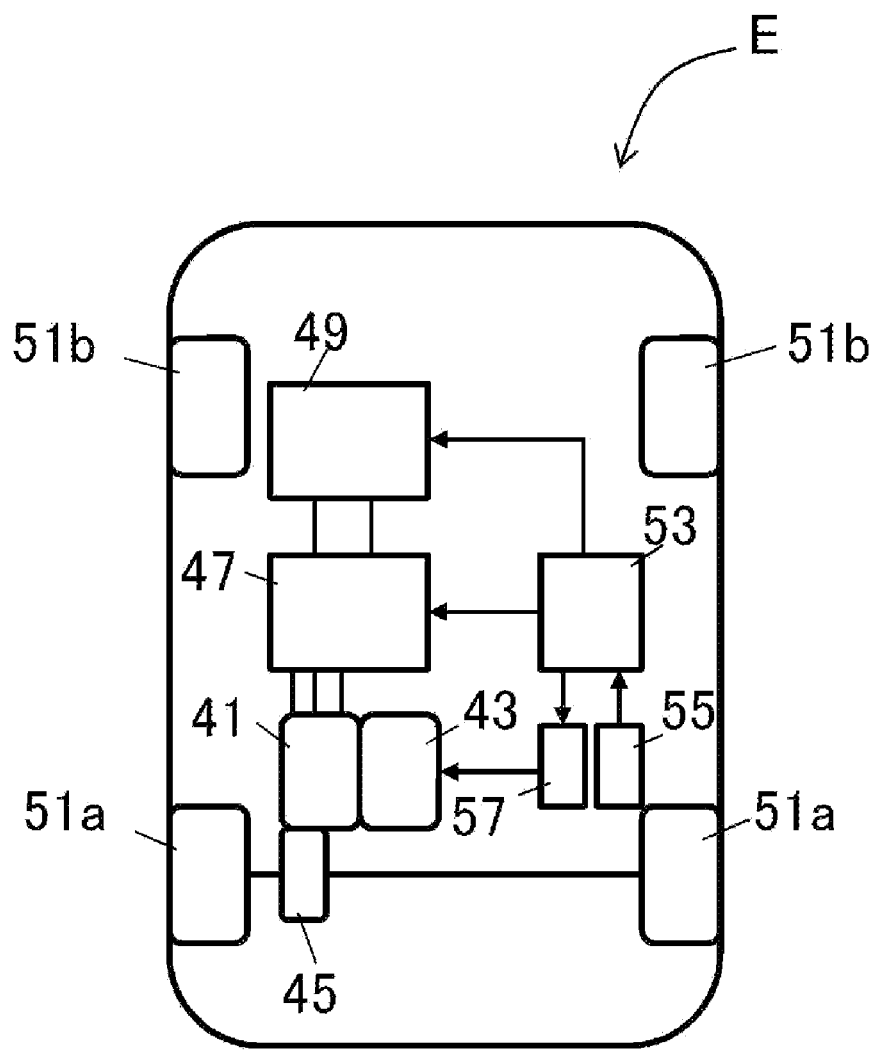
FIG. 7 is a schematic diagram of an example electric vehicle.

FIG. 7 is a schematic diagram of an electric vehicle. FIG. 7 illustrates a hybrid electric vehicle (HEV) as an example of the electric vehicle.

The electric vehicle E includes a motor 41, an engine 43, a transmission 45, an inverter 47, a power supply (battery) 49, front wheels 51a, and rear wheels 51b.

The electric vehicle E includes an output unit, such as the motor 41, the engine 43, or both, as the drive source. The output from the drive source is transmitted to the pair of left and right front wheels 51a through the transmission 45. The power supply 49 is connected to the inverter 47, which is connected to the motor 41.

The electric vehicle E illustrated in FIG. 7 also includes a vehicle electronic control unit (ECU) 53 and an engine ECU 57. The vehicle ECU 53 centrally controls the entire electric vehicle E. The engine ECU 57 controls the rotational speed of the engine 43 and drives the electric vehicle E. The electric vehicle E further includes an ignition key 55 operable by, for example, a driver, and driving components such as an accelerator pedal and a brake (not illustrated). The vehicle ECU 53 receives an input drive signal in response to an operation on a driving component performed by, for example, the driver. The vehicle ECU 53 outputs, based on the drive signal, an instruction signal to the engine ECU 57, the power supply 49, and the inverter 47 as a load. In response to the instruction signal, the engine ECU 57 controls the rotational speed of the engine 43 and drives the electric vehicle E.

The inverter 47 in the electric vehicle E includes the inverter D, which includes the film capacitor A as the capacitance portion 33. The electric vehicle E includes the film capacitor A that has insulation resistance less likely to decrease. In a harsh environment such as in an engine part of the electric vehicle E, the film capacitor A may have insulation resistance less likely to decrease over a long period. The electric vehicle E thus allows more stable current control performed by controllers such as ECUs.

In addition to HEVs, the inverter D in the embodiment is also applicable to various power converting products such as electric vehicles (EVs), fuel cell vehicles, electric bicycles, power generators, and solar cells.

The present disclosure may be implemented in the following forms.

In one or more embodiments of the present disclosure, a film capacitor includes a stack including at least one dielectric film including a polyarylate film and a plurality of metal films being alternate to each other, cover films containing a polyester hot-melt resin and located on two first side surfaces of the stack opposite to each other in a first direction orthogonal to a stacking direction of the stack, and metal-sprayed electrodes on two second side surfaces of the stack opposite to each other in a second direction perpendicular to the first direction and orthogonal to the stacking direction.

In one or more embodiments of the present disclosure, a connected capacitor includes a plurality of film capacitors including the above film capacitor, and a busbar connecting the plurality of film capacitors.

In one or more embodiments of the present disclosure, an inverter includes a bridge circuit including a switching element, and a capacitance portion connected to the bridge circuit. The capacitance portion includes the above film capacitor.

In one or more embodiments of the present disclosure, an electric vehicle includes a power supply, an inverter connected to the power supply and being the above inverter, a motor connected to the inverter, and wheels drivable by the motor.

In one or more embodiments of the present disclosure, the film capacitor can reduce discharge from the metal films due to gaps between the cover films and the metal films.

In one or more embodiments of the present disclosure, the connected capacitor can have insulation resistance less likely to decrease.

In one or more embodiments of the present disclosure, the inverter includes the film capacitor that can have insulation resistance less likely to decrease.

In one or more embodiments of the present disclosure, the electric vehicle allows more stable current control performed by the controllers such as the ECUs.

Although the embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

REFERENCE SIGNS

A film capacitor
C connected capacitor
D inverter
E electric vehicle
1, 1a, 1b dielectric film
2, 2a, 2b metal film
3 body
3a, 3b first surface
3c, 3d first side surface
3e, 3f second side surface
4, 4a, 4b metal-sprayed electrode
6, 6a, 6b metalized film
7, 7a, 7b insulating margin
12 film capacitor device 16a, 16b cover film
21, 23 busbar
31 bridge circuit
33 capacitance portion
35 booster circuit
41 motor
43 engine
45 transmission
47 inverter
49 power supply
51a front wheel
51b rear wheel
53 vehicle electronic control unit (ECU)
55 ignition key
57 engine electronic control unit (ECU)

The invention claimed is:

1. A film capacitor comprising:
a stack including at least one dielectric film and a plurality of metal films, the at least one dielectric film including a polyarylate film, wherein each of the at least one of dielectric film and each of the plurality of metal films are alternately stacked in a stacking direction, each of the plurality of metal films deposited on each of the at least one dielectric film by vapor deposition;
cover films on two first side surfaces, the two first side surfaces facing each other in a first direction, the first direction orthogonal to the stacking direction, the cover films comprising a polyester hot-melt resin; and
metal-sprayed electrodes on two second side surfaces, the two second side surfaces facing each other in a second direction, the second direction perpendicular to the first direction and orthogonal to the stacking direction.

2. The film capacitor according to claim 1, wherein each cover film of the cover films has a thickness that is 0.1 μm, 1000 μm, or larger than 0.1 μm and smaller than 1000 μm.

3. A connected capacitor comprising:
a plurality of film capacitors including the film capacitor according to claim 2; and
a busbar connecting the plurality of film capacitors.

4. An inverter comprising:
a bridge circuit including a switching element; and
a capacitance portion connected to the bridge circuit, the capacitance portion including the film capacitor according to claim 2.

5. A connected capacitor comprising:
a plurality of film capacitors including the film capacitor according to claim 1; and
a busbar connecting the plurality of film capacitors.

6. An inverter comprising:
a bridge circuit including a switching element; and
a capacitance portion connected to the bridge circuit, the capacitance portion including the film capacitor according to claim 1.

7. An electric vehicle comprising:
a power supply;
the inverter according to claim 6 connected to the power supply;
a motor connected to the inverter; and
wheels drivable by the motor.

* * * * *